United States Patent [19]

Schröder

[11] Patent Number: 5,353,276
[45] Date of Patent: Oct. 4, 1994

[54] PROCESS FOR RECORDING AND/OR REPRODUCING DIGITAL DATA ON A RECORD CARRIER

[75] Inventor: Ernst F. Schröder, Hanover, Fed. Rep. of Germany

[73] Assignee: Deutsche Thomson-Brandt GmbH, Fed. Rep. of Germany

[21] Appl. No.: 948,082

[22] Filed: Sep. 21, 1992

Related U.S. Application Data

[63] Continuation of Ser. No. 389, Mar. 2, 1991.

[30] Foreign Application Priority Data

Mar. 12, 1990 [DE] Fed. Rep. of Germany ....... 4007814

[51] Int. Cl.$^5$ .............................................. G11B 7/007
[52] U.S. Cl. ................. 369/275.1; 369/275.3; 369/47
[58] Field of Search ............... 369/275.1, 275.3, 275.4, 369/277, 47, 59, 60, 62

[56] References Cited

U.S. PATENT DOCUMENTS

| 4,506,303 | 3/1985 | Hannan | 358/302 |
| 5,148,422 | 9/1992 | Sako et al. | 369/275.1 |

FOREIGN PATENT DOCUMENTS

| 0268454 | 5/1988 | European Pat. Off. | G11B 20/10 |
| 2261586 | 2/1975 | France | G11B 7/00 |
| 2317726 | 7/1975 | France | G11B 5/00 |

*Primary Examiner*—Paul M. Dzierzynski
*Assistant Examiner*—Don Wong
*Attorney, Agent, or Firm*—Joseph S. Tripoli; Eric P. Herrmann; Lester L. Hallacher

[57] ABSTRACT

A method of recording bursts of digital data onto a rotating recording medium having a helical data track moving at a fixed linear rate with respect to a read/write unit includes the steps of temporarily storing the data bursts and reducing the data rate of the bursts during storage. The bursts are stored as clusters at spaced locations around the track while leaving pauses between the clusters. The pauses are used to relocate the read/write head to the position where the next burst will be recorded before recording the next burst.

10 Claims, 1 Drawing Sheet

PROCESS FOR RECORDING AND/OR REPRODUCING DIGITAL DATA ON A RECORD CARRIER

This is a Continuation of PCT Application PCT/EP 91/00389, filed Mar. 2, 1991 by Ernst F. Schroder and titled "Process For Recording And/Or Reproducing Digital Data On A Record Carrier".

Scannable rotating recording media, such as a compact disc (CD) or a magneto-optical disc (MOD), are suitable for storing digital data, preferably digital audio or video data, in large quantities. Such recording media (records) typically have, a spiral-shaped (helical) data track. During recording or playback, the record rotates and the data track passes a radially movable read/write head, which supports a laser used to record or read data onto or from the record. A constant linear velocity CLV unit in the record/write device ensures that a constant linear velocity of the read/write head with respect to the record is maintained (1.2 m/s for a CD).

With recording techniques presently used, the digital data are continuously recorded from the beginning to the end of a data track on the record, using a fixed data rate for the entire recording. This technique is disadvantageous because the data, which can be provided from master tapes, must be continuously available. This is not always possible for the large memory capacity of some record carriers, and hence the individual recording of data can be limited.

For standard audio recording in the CD format, the data rate is 1.4112 Mbit/s, i.e. 16 bit (per scanning value) * 44.1 kHz (standard scanning frequency for VD) * 2 (for stereo). With a net data rate of such magnitude (net data rate is the data rate which is needed to store or transmit, one second of sound information or one second of picture information), playback times in the order of 60 min can be realized for the record. In order to increase the playback time, while keeping the same scanning frequency and recording in stereo, several data reduction techniques are known which do not record all 16 bits per scanning value. For example, NIC (near instantaneous companding), MSC (multi-adaptive spectral audio coding), DPCM (differential pulse-code modulation), ADPCM (adaptive differential pulse-code modulation) or delta modulation are examples. These techniques allow reduced data sound recordings without severe loss of quality when compared to standard CD recordings while extending the playing time to four hours per record.

It is an object of this invention to assure, with optional reading and writing access, recording and/or scanning of data on a record medium.

In principle, the conventional continuous recording of digital data is replaced by a burst-wise recording wherein each burst of data is, internally, continuously recorded. By using the burst-wise recording of data, each burst preferably forms a cluster on the record medium. One burst of data means a fixed quantity of data, for example, one or more bits. A cluster is a fraction of a track which essentially contains one burst of data. Recording with such clusters is hereinafter referred to as "cluster recording". With this recording technique it is immaterial whether or not the data rate of the data to be recorded was reduced by means of one of various data reduction techniques mentioned above. By using the "cluster recording" technique described herein it is possible, inter alia, to operate in any of the following modes of operation:

1. Data recording with optional reading and writing access to data, also with differing net data rates.
2. Long play (>1 h) sound recording by means of a sound data reduction technique such as MSC.
3. An extremely long play (up to 84 h) speech recording.

The data are preferably recorded the same as in the CD standard recording format using the unchanged scanning speed of 1.2 m/s and the scanning frequency of 44.1 kHz and, therefore, the standard CD data rate of 1.411 Mbit/s, so that no modifications are necessary to the CLV system or the equalizer circuits of conventional recording and playback units. Consequently, a recording of 1.411 Mbit on the record carrier which, for example, have been data reduced by means of the MSC technique, contains information for approximately four seconds, instead for just one second of sound recording as does the CD standard. It is therefore advantageous to provide the data to be recorded with an error protection code such as, for example, the cross interleaved Reed Solomon code (CIRC), to interleave the data prior to recording and, using a channel code, for example, an EPM (eight-to-fourteen modulation) code, to record the data on the record, whereby the data are structured in EFM frames. Each EFM frame preferably contains 24 Bytes of wanted data.

It is advantageous to have a spiral-shaped (helical) data track in the record medium. The data track should be preformatted with unambiguous position data, preferably by means of the absolute time in pre-groove (ATIP) method. Thereby, each burst of data, and hence each cluster, on the record medium can be individually accessed in order to delete, rewrite or read, etc. the corresponding data. Such data recording with optional reading and writing access has great advantageous, especially for computers. Individual recording of, for example sound data, is also made with this technique.

It is advantageous to dimension the length of a cluster such that it corresponds to a whole number multiple of an ATIP block and hence, to a whole number multiple of an EFM frame. Consequently, the unambiguous allocation of an ATIP block and an EFM frame to a cluster is determined, thereby ensuring, above all, the unambiguous addressability of a cluster.

In an effort to provide error-free recording, prior to recording a subsequent cluster CL2, the prior recorded cluster CL1 is preferably reread, and in the event of defective recording the cluster CL1 is recorded anew, and the defective cluster is marked in order to avoid the repetition and playback of the defective cluster during playback of the record medium.

After filtering out the analog signal by means of a low pass filter 1 and scanning by means of a 16-bit analog-to-digital converter 2, scanning pulses for values of 16 bits each are available at the output of A/D 2 and are ready for further processing. The scanning values are arranged into blocks and are subjected to Fourier transformation in a special arithmetic unit 3. The result is a set of 1024 spectral coefficients for each block. The set of coefficients could also be obtained using a digital spectral analyzer normally used in measurement technology. The rate and phase values are now multiple adaptive-coded in an MSC coder 4, i.e. significant coefficients are presented and transmitted with many bits (up to 14), less significant bits with only a few bits. Very small insignificant coefficients are set to zero and not transmitted. The "bits saved" in such a case are added to other significant coefficients which are then correspondingly precisely transmitted.

Figure 1:
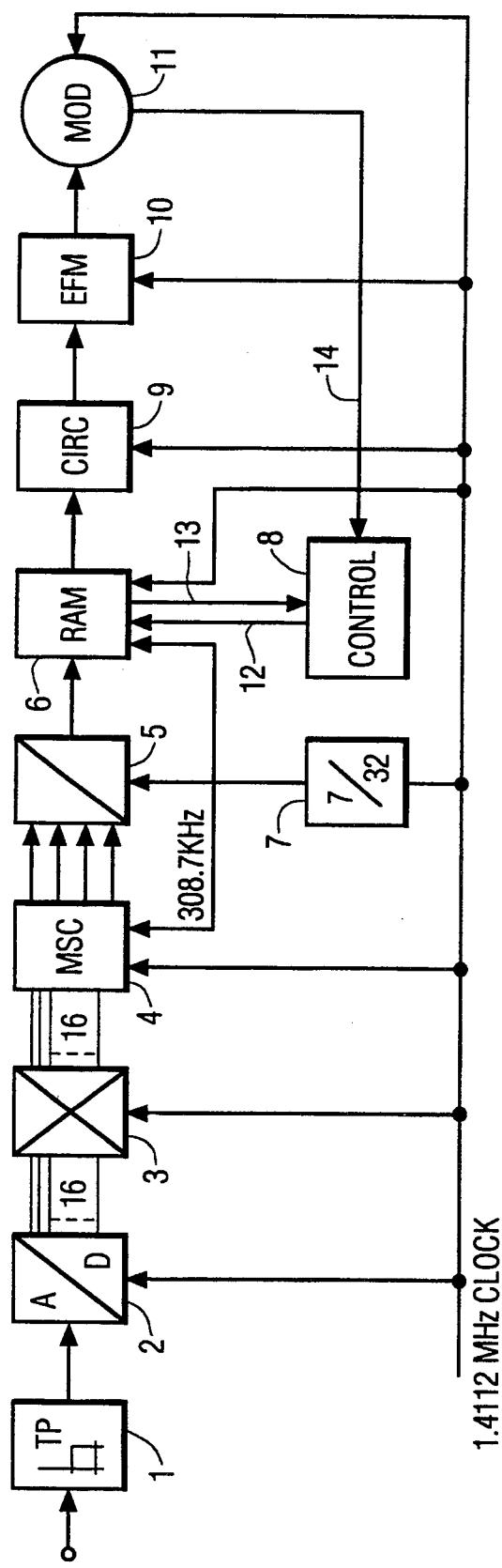
FIG. 1 is a block diagram of a preferred embodiment of a system for recording a sound channel with MSC data reduction.
Figure 1:
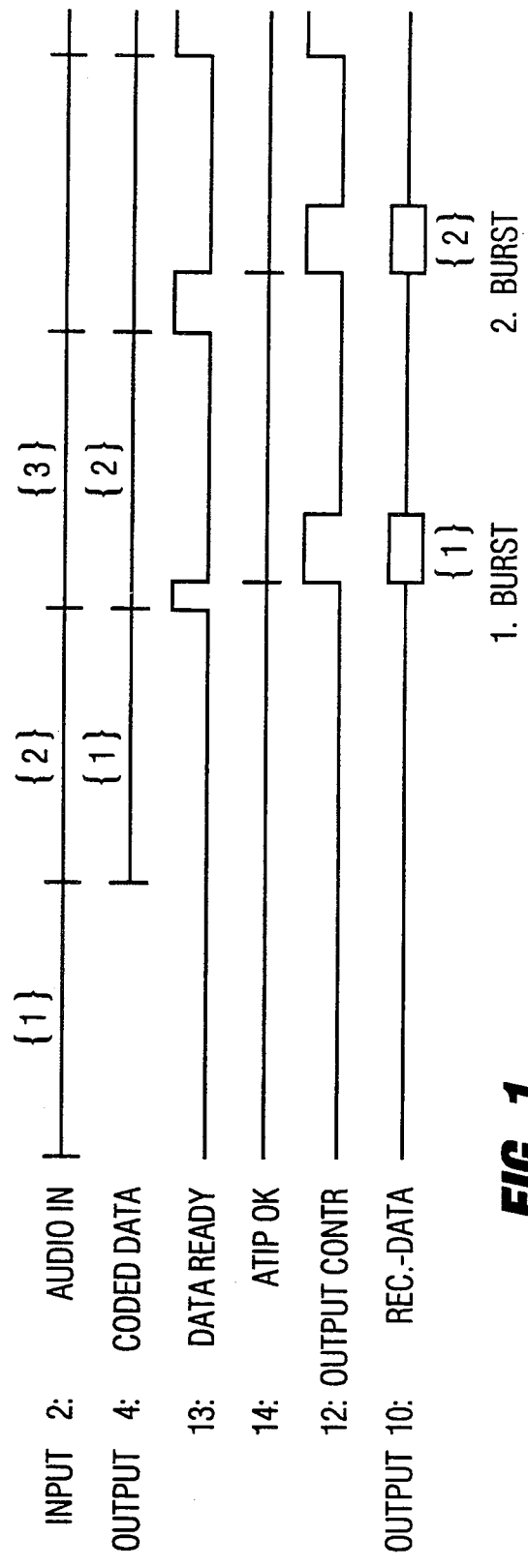

After the MSC data reduction, the digital data are output by the coder 4 with a 308.7 kHz frequency and are fed to a parallel-to-serial converter 5, the output of which is connected to the data input of an intermediate memory 6. While the read-in clock frequency of the intermediate memory is 308.7 kHz, the read-out frequency is 1.4112 MHz. A 7/32 frequency divider 7 converts the 1.4112 MHz clock frequency to 308.7 kHz. The intermediate memory 6 is controlled by a control unit 8, which inter alia compares the current position date 14 on the record 11 with the desired position date. The intermediate memory provides via the line 13, a "Data Ready" signal only when at least a much data as is provided for the desired burst is stored in the intermediate memory 6. When the recording unit has reached its desired position, the read-out the memory 6 is activated via a "Output Control" signal on line 12 and the corresponding burst of data is read out from the intermediate memory using the CD standard recording data rate of 1.4112 Mbit per second, provided with a CIRC error code protection (cross interleaved Reed Solomon code) in a Reed Solomon coder 9 and subjected to interleaving. An interleaving memory (not illustrated) is disposed in the coder 9 for the interleaving. The chronological progression of the processing and recording of digital data is shown by a graphical representation in FIG. 1. Because a contactless scannable rotating record medium 11, such as the MOD, can include various physical defects, which can never be entirely avoided during production of the disc, the audio signals to be recorded are coded according to this special coding procedure. The data coded in the Reed Solomon coder 9 are subjected to EFM modulation (eight-to-fourteen modulation) in a modulator 10 and recorded on the MOD with the help of the line code, whereby the data are structured by the EFM modulation into EFM frames. This is also the format used on a compact disc.

The recording is organized so that 24 bytes of wanted data (=6 stereo scanning values each of 16 bits) are recorded in one EFM frame. As a result of the interleaving, the 24 bytes of data in one frame do not belong to neighboring scanning values of the wanted input data. The data belonging to adjacent scanning values are distributed over approximately 110 successive frames. This improves the error protection.

In principle, the scanning, or reproduction, of data on the record is the reciprocal to the recording. The magneto-optical disc (MOD) 11 used here as a contactless scannable rotating record carrier comprises a preformatted helical track which contains data for characterizing an absolute position and for controlling the scanning unit. The preformatting is carried out with the ATIP (absolute time in pre-groove) method. For such preformatting, the track is modulated horizontally and with a frequency (for example 22.05 kHz) which is proportional to the audio scanning frequency. This frequency also serves to synchronize a CLV servo in the record/playback unit. This frequency is phase-modulated in a biphase format with the ATIP data. The data rate which can be achieved with this technique is relatively low but is sufficient for recording absolute position data in the format described above.

ATIP information can be constantly read and output via signal line 14 to the control unit 8 during the writing and reading of data on the record medium. With the MOD this is realized in that ATIP information is read by means of the read/write unit (laser) and can be evaluated via the tracking unit which also operates during reading and writing.

The time segment on the storage medium containing such ATIP information is called the ATIP block. The format on the MOD is so arranged that during an ATIP block, 98 EFM frames are recorded or read. Therefore, unwritten locations of the preformatted track on a record medium can be accurately located with the help of ATIP. The accuracy for this is given by the number of EFM frames, in this case with an accuracy of 98 frames. With a MOD of the described format and a scanning speed of 1.2 m/s (as with a CD), an EFM frame has a length of 136.05 microseconds and hence, an ATIP block length is 13.3 msec. or 1/75 sec.

A search procedure for a particular ATIP (n) block is performed in that the preceding ATIP (n-1) block is read. If this block is decoded, it is known that the desired block follows immediately and can now be read or written. The search procedure runs as follows:
1. read the current ATIP,
2. decide whether waiting for up to one revolution is sufficient or whether a jump to a new track is necessary,
3. jump command from the mechanical mechanism,
4. read ATIP at (possible coincidental) target,
5. decide whether a jump to a new track is necessary for correction or whether waiting for up to one revolution is sufficient,
6. read ATIP until ATIP (n-1).

The desired recording is carried out in that the digital data to be recorded, as mentioned above, are assembled in an intermediate memory 6 and output in bursts with the standard recording data rate for CD, i.e. 1.4112 Mbit/s. Each burst of data in the intermediate memory is continuously recorded on the record medium in allocated clusters with a fixed number (98 for example) of ATIP blocks and EFM frames. There is then time to reposition corresponding to a downgraded net data rate. If the intermediate memory is filled up again, the writing unit (laser optics and magnetic head) should again just arrive at, or be just in front of, the end of the cluster written last. In order to be able to achieve this, it is necessary that the number of frames per cluster is greater than or equal to the product of a reduction factor K and the maximum number of frames per revolution (with a CD approximately 2220 at the outside). With MSC data reduction, the reduction factor K is 0.25 and the number of frames per cluster should, therefore, be at least a bit larger than 555. Owing to the unambiguous addressability via ATIP, the length of a cluster is a whole number multiple of the ATIP length.

If the recording stops at a random point, the CIRC coding part, because of the code interleaving, contains data in the interleaving memory of the Reed Solomon coder 9, which belong with data already recorded. In this case the coding can be halted and then restarted upon writing the next cluster, thereby writing the remaining data into the start of the next cluster. This is not always easy to put into practice because stopping the hardware is not always possible immediately and because there is a danger of imprecise linking of the data.

Therefore, a current cluster is not filled completely with wanted data, instead the coding of the wanted data, in accordance with the interleaving length, is terminated before the cluster is filled and at the end of the cluster the interleaving memory is just emptied.

In addition to the consequences arising from the interleaving the fact that the read/write laser must be changed from a read mode to a write mode at the start of the recording procedure for one cluster must be taken into account. However, the laser (scanning unit) cannot always perform the change rapidly and accurately. Therefore, at the start of a cluster, some data are frequently lost. For this reason some dummy empty data are written at the start of a cluster, for example 1 to 3 EFM frames.

In order to keep the loss of dummy data at the start small and by emptying the interleaving memory at the end of every cluster, a cluster is not necessarily kept as short as possible. Owing to the necessary organization of a directory for the recorded data and the intrinsic flexibility of the record medium, which of course should not be eliminated through cluster recording, the length of a cluster is also not arbitrarily long. The following cluster length 1CL is defined here for the MOD 13 with cluster recording:

$1_{CL}$ = 1176 EFM frames = 12 ATIP blocks = 0.16 sec.
The distribution within a custer is as follows:

| Number of EFM frames | Content |
|---|---|
| 1 | link frame |
| 2 | run-in |
| 1029 | data |
| 111 | interleaving |
| 2 | run-out |
| 1 | link frame |
| 0 | unused |

This design means that 24696 bits of wanted data are recorded in one cluster, actually taking the space of 28224 bits. The loss in storage capacity is $\frac{1}{8}$ = 12.4 per cent. A further consequence of the special selection specified above is that the clock frequency of the reduced wanted data is in a simple ratio to the "normal CD" clock frequency:

$\frac{1}{4} * (1\frac{1}{8}) = 7/32$.

The gross data rate which may be recorded is reduced by cluster recording to $\frac{1}{4}$ as desired, but only 7/32 of the standard date rate is available for the net rate owing to the $\frac{1}{8}$ loss. Therefore, the net data rate which can be achieved in the above case is:

7/32 * 1.4112 Mbit/s = 308.7 kHz/sec.

This corresponds to specifying a quantization with 3.5 bit/sample, a rate which is very realistic when using modern data reduction techniques, such as MSC used in this example. Owing to the simple dividing ratio of 7/32, simple synchronization of external, data-reduced sources with the record medium is also possible with the described design.

To summarize, cluster recording means that the wanted data is not recorded in a continuous sequence of 7350 EFM frames per second each with 24 usable bytes, as is the normal CD format. Instead, the recording is carried out in clusters, with each cluster consisting of a continuous sequence of a certain number of EFM frames. However, between the clusters the recording is not continuous. A result is that each cluster can be optionally accessed for reading and, in particular, also for writing without the information recorded in the preceding or following clusters being disturbed. Optional writing access to a cluster requires no special measures for rapidly changing the laser between the read and write modes of operation because of the length of the gaps between clusters.

After a cluster is written there is a pause which is used to position the start of the next cluster. In order to find the start of the next cluster, the ATIP blocks at the end of the next cluster are decoded. It is possible, therefore, to position it so that the entire final cluster is read once again before the one directly next is written again. This allows recording errors to be established and then discontinue the recording procedure in the case of too many errors or to alert the user that a large number of errors exist.

Error correction is provided in addition to error recognition. For error correction the data of the last cluster are maintained in an intermediate memory. There are two conceivable strategies for error correction: First, the data are repositioned to the start of the defective cluster and then the data are written once again. The data of the following cluster follow directly after the rewritten data. However, time is used for the positioning so that the pause between two writing cycles is possibly not long enough for positioning, correction reading, repositioning and correction writing. Because a recording error can also be linked with a flaw in the record medium, it is preferable, in the case of an error, to rewrite the data from the defective cluster into the following cluster and the actual following data into the then following cluster. The defective cluster is then marked so that it can be simply skipped over during readout.

The marking is carried out in a directory UTOC (User Table of Content) of the record medium or in a special cluster at the start and finish of the current continuous cluster recording. It is also possible to so mark (for example, a different synchronization word) the cluster following the rewritten cluster to indicate that there is an error in the preceding cluster. This means, however, that upon playback, one cluster must always be read out in advance.

Data recordings from computers which operate with a system such as the MS-DOS system utilize blocks of 1024 bytes. If a cluster corresponding to the above details is designed, then 24 blocks with 1024 wanted bytes, possible with additional bits for error protection, can be recorded without any problem in one cluster with at least 1029 usable EFM frames. Addressability is also provided and cluster recording is therefore also suitable for data recording in a computer.

Because the recording is done in clusters having a duration of 0.16 sec. and because of the subsequent pauses of 0.48 sec. until the recording of the next cluster, a positioning strategy is provided because it cannot be assumed that the laser is located at the start of the next cluster after the pause has expired. One possible strategy is explained immediately below, and makes clear the logical course of events. However, in practice deviations from the described sequence are certainly possible. The data supplied by the MSC coder 4 of the sound data reduction method with 308.7 kBit/s are, as mentioned above, portioned in the intermediate memory 6 or a dual buffer. The read-in clock frequency is 308700 Hz and the read-out clock frequency is 1411200 Hz. The length of the two buffers is each 197568 bits=24696 bytes. Writing of the first cluster is started at ATIP (n). After writing 1143 EFM frames, the writing process is concluded. After the waiting time of 0.48 sec. the dual buffer outputs a "Data read" signal. A search procedure is now performed on the block at ATIP (n+12). For this search, a maximum of four tracks must be jumped over moving toward the center of the disc. Also, a maximum waiting time of one revolution may become necessary. The next cluster can then be written. Up to 400 msec. are available for the complete positioning procedure. The positioning must be reliably completed within this time.

It can be assumed that a jump to the next neighboring track on the inside can be performed with great reliability. Therefore, the following strategy is also possible. Writing of the first cluster is started at ATIP (n). After writing 1143 EFM frames, the writing process is concluded. Immediately after the first writing a jump of one track toward the center of disc is made and a search for ATIP (n+12) is instigated. This is repeated until the intermediate memory 6 gives a "Data ready" signal. When ATIP (n+12) is found again the writing procedure for the second cluster begins. After this writing procedure has finished there is then another jump of one track towards the inside and again a search procedure for ATIP (n+12) and so on. The advantage with this strategy is that the jumps will always be only by one track although the procedure must take place more frequently. The recording of the next cluster can begin at the latest one revolution after "Data ready".

After writing the first cluster a search procedure for ATIP (n) is completed the data just written can be read as a means of checking. Evaluation of the errors which have appeared can instigate suitable measures, for example, warning signals or display of the error rate.

When errors which cannot be corrected are detected upon the control reading a cluster at ATIP (n) is recognized as defective and can be rewritten at ATIP (n+12). This is noted in a suitable manner in the UTOC (User Table of Content) so that the defective cluster at ATIP (n) can be omitted during playback. The intermediate memory 6 is suitably constructed, for example, as a cyclic triple dual buffer in order to be able to execute the writing repetition described in the case of errors.

The method described above is not restricted to datareduction of data and a certain data-reduction technique such as the MSC used here. Likewise, recording and reproduction with non-data-reduced data and/or with reduced data rates by means of other data-reduction techniques can be carried out on a record medium.

One further possibility of recording or reproducing data would be to record on to the record medium, or to read, the data rate reduced by means of MSC burst-wise with the help of the intermediate memory and them, after a certain recording or playback time, to pause three times as long. In this manner the record carrier can be filled to 25 per cent in one run. When the end is reached, a return to the beginning can be made during a ¾ pause and fill or read an additional 25 per cent of the disc in a second run. The other 50 per cent of the disc can be filled with two subsequent runs. This process necessitates a difficult organization of the disc contents. The record carrier then contains either one normal or one data-reduced program. The defined jump from the end to the start of the track is critical.

One fundamentally different possibility independent of the solutions described above would be to reduce the scanning speed corresponding to the reduction factor. If the wavelength on the record medium remains the same, then with a reduction factor of ¼ this would result automatically in a quarter of the recording data rate and a playing time four times as long. However, the CLV system must be switchable between two speeds. Also, the equalization circuits, for the signals coming from the record medium, receive signals with one-quarter of the normal frequency and must, therefore, be switchable. Mixing of "normal" recordings and data-reduced recordings on one disk is possible only if rapid switchover of the CLV between two speeds in a ratio of 4:1 is possible.

The invention can be applied equally to a recording and/or play back of digital data on a magnetic tape with PCM signals or a recording on a DAT (digital audio tape) in a DAT recorder. The organizational structure of a DAT recording can be established in a manner equivalent to the method described above with only slight modifications.

I claim:

1. A method of recording bursts of digital data onto a rotating recording medium having a helical data track moving at a fixed linear rate with respect to a read/write unit comprising the steps of:
   temporarily storing said data bursts and reducing the data rate of said bursts during said storage;
   recording said bursts as clusters at spaced locations around said track while leaving pauses between said clusters;
   utilizing said pauses to relocate said read/write head before recording the next burst.

2. The method of claim 1 wherein each of said clusters has a predetermined number of frames.

3. The method of claim 2 wherein at least one frame of each cluster is used to code the location of the cluster.

4. The method of claim 3 wherein at least one of the frames in each cluster is used to code the location of the next cluster.

5. The method of claim 3 wherein each of said clusters includes an error reduction code.

6. The method of claim 5 further including the steps of reading the last recorded cluster prior to recording the subsequent cluster onto said recording medium, and rerecording any cluster found to be defective.

7. A record for storing and playing digital data representative of an analog signal digitized at a first data rate comprising:
   a helical data track, said data track including a plurality of data clusters, each of said data clusters being composed of a plurality of frames and each of said cluster representing a burst of data having a data rate lower than said first data rate, at least one frame of each cluster having a code for identifying the cluster; and
   a plurality of pauses between said clusters, said pauses providing operation time for a recording/playback unit useful with said record.

8. The record of claim 6 wherein at least one frame of each of said clusters includes a code for locating another cluster frame of said record.

9. A system for recording a digital representation of an analog signal onto a recording medium comprising:

means for receiving said analog signal and converting said analog signal into a first digital signal having a first data rate;

means for compressing said first digital signal into a second digital signal having second data rate lower than said first data rate;

storage means for temporarily storing said second digital signal;

means for controlling said storage means and for dividing said second digital signal into a plurality of bursts separated by a plurality of pauses; and means for providing said bursts and pauses to said recording medium.

10. The system of claim 8 wherein said means for dividing includes means for dividing said second digital signal into a plurality of frames, and means for combining a preselected number of said frames into each of said bursts.

* * * * *

UNITED STATES PATENT AND TRADEMARK OFFICE
CERTIFICATE OF CORRECTION

PATENT NO. : 5,353,276

DATED : October 4, 1994

INVENTOR(S) : Ernst F. Schroder

It is certified that error appears in the above-identified patent and that said Letters Patent is hereby corrected as shown below:

In column 8, line 64, Claim 8, after "The record of claim" delete [6] and insert --7--

In column 10, line 6, Claim 10, after "The system of claim" delete [8] and insert --9--

Signed and Sealed this

Nineteenth Day of September, 1995

Attest:

BRUCE LEHMAN

Attesting Officer

Commissioner of Patents and Trademarks